United States Patent
Liang et al.

(10) Patent No.: US 12,232,067 B2
(45) Date of Patent: Feb. 18, 2025

(54) TIME-DELAY COMPENSATION METHOD AND APPARATUS, AND DEVICE

(71) Applicant: GUANGDONG OPPO MOBILE TELECOMMUNICATIONS CORP., LTD., Guangdong (CN)

(72) Inventors: Bin Liang, Dongguan (CN); Jing Xu, Dongguan (CN); Yanan Lin, Dongguan (CN); Zhe Fu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 424 days.

(21) Appl. No.: 17/749,933

(22) Filed: May 20, 2022

(65) Prior Publication Data
US 2022/0279468 A1 Sep. 1, 2022

Related U.S. Application Data
(63) Continuation of application No. PCT/CN2020/073330, filed on Jan. 20, 2020.

(51) Int. Cl.
*H04W 56/00* (2009.01)
*H04B 17/318* (2015.01)

(52) U.S. Cl.
CPC ...... *H04W 56/0045* (2013.01); *H04B 17/318* (2015.01); *H04W 56/001* (2013.01)

(58) Field of Classification Search
CPC .......... H04W 56/0045; H04W 17/318; H04W 56/001
See application file for complete search history.

(56) References Cited

U.S. PATENT DOCUMENTS

| | | | | |
|---|---|---|---|---|
| 9,131,434 B2* | 9/2015 | Suzuki | ................. | H04L 5/0092 |
| 2013/0272232 A1* | 10/2013 | Dinan | .................. | H04W 72/20 |
| | | | | 370/329 |
| 2018/0167172 A1 | 6/2018 | Hosseini et al. | | |

FOREIGN PATENT DOCUMENTS

| CN | 106059698 A | 10/2016 |
|---|---|---|
| WO | 2019137609 A1 | 7/2019 |

OTHER PUBLICATIONS

International Search Report Mailed Oct. 21, 2020 in Application No. PCT/CN2020/073330.

(Continued)

*Primary Examiner* — Brenda H Pham
(74) *Attorney, Agent, or Firm* — PERKINS COIE LLP

(57) ABSTRACT

A time-delay compensation method and apparatus, and a device. The method comprises: a time-delay compensation method, which is applied to a terminal device. The time-delay compensation method comprises: receiving first information, the first information being used for the terminal device to determine whether to perform a transmission time-delay compensation; and determining whether to perform the transmission time-delay compensation according to the first information. In the present application, the terminal device determines, according to the first information sent by a network device, whether a transmission time-delay compensation is required, so as to solve the problem in the prior art that when transmission time-delay compensation is performed is unknown, so that service transmission in a communications network can achieve accuracy requirements of time synchronization.

6 Claims, 3 Drawing Sheets

(56) References Cited

OTHER PUBLICATIONS

Nokia, Nokia Shanghai Bell, Text proposal for TSN requirements evaluation, 3GPP TSG RAN WG1 #96, R1-1901918, Athens, Greece, Feb. 25-Mar. 1, 2019, 6 pages.

Nokia, Nokia Shanghai Bell, Summary of e-mail discussion: Synchronisation (Nokia), 3GPP TSG-RAN WG2 Meeting #106, R2-1907193, Reno, USA, May 13-17, 2019, 20 pages.

ZTE Corporation, Sanechips, China Southern Power Grid Co., Ltd, Signalling aspects for accurate reference timing delivery in TSC, GPP TSG-RAN WG2 #107bis, R2-1912897, Chongqing, China, Oct. 14-18, 2019, 7 pages.

Huawei, HiSilicon, China Southern Power Grid Co., Ltd, Propagation delay compensation for accurate reference timing, 3GPP TSG-RAN WG2 Meeting #107bis, R2-1913962, Chongqing, China, Oct. 14-18, 2019, 3 pages.

ZTE Corporation, Sanechips, China Southern Power Grid Co., Ltd, Remaining issues for accurate reference timing delivery in TSC, 3GPP TSG-RAN WG2 #108, R2-1914725, Reno, Nevada, USA, Nov. 18-22, 2019, 7 pages.

Vivo, Propagation delay compensation for reference time, 3GPP TSG-RAN WG2 Meeting #108, R2-1914959, Reno, USA, Nov. 18-22, 2019, 3 pages.

Nokia, Nokia Shanghai Bell, Remaining issues for accurate reference time delivery, 3GPP TSG-RAN WG2 Meeting #108, R2-1915691, Reno, USA, Nov. 18-22, 2019, 4 pages.

Qualcomm Incorporated, Discussion of RAN1 LSs on propagation delay compensation and way forward, GPP TSG-RAN WG2 Meeting #108, R2-1915812, Reno, USA, Nov. 18-22, 2019, 3 pages.

Extended European Search Report for European Application No. 20914933.5 issued Oct. 12, 2022. 8 pages.

* cited by examiner

TIME-DELAY COMPENSATION METHOD AND APPARATUS, AND DEVICE

CROSS-REFERENCE TO RELATED APPLICATION

The present application is a continuation application of International PCT Application No. PCT/CN2020/073330, filed on Jan. 20, 2020, the entire content of which is hereby incorporated by reference.

TECHNICAL FIELD

The present invention relates to the technical field of communication, in particular to a method for compensating time-delay, an apparatus, and a device.

Background

Transmissions of services, such as Factory Automation, Transport Industry, or Electrical Power Distribution, etc., in a 5G system, need to be supported by Industrial Internet of Things (IIoT). Based on their transmission requirements on time-delay and reliability, the IIOT introduces Time Sensitive Networking (TSN) or Time Sensitive Communication (TSC). In the TSN, a 5G network will serve the TSN and services as a TSN bridge. Therefore, a New Radio (NR) system needs to provide lower delay guarantee and higher time synchronization accuracy, so that when the Factory automation service is transmitted in the 5G network, it is ensured that the operation and the continuity of every point for a mechanical operation are accurate and conform to time requirements.

Based on transmission requirements of TSN services, when the TSN services are transmitted within 5G, they need to meet a time synchronization accuracy requirement of 1 us. A synchronization error of a terminal device is determined by RAN1, and the error is related to many factors, such as a propagation loss, or a device limitation, etc. According to RAN1 LS, in some scenarios, transmission time-delay compensation is needed to be able to make a time synchronization error of a physical layer within a required range, so as to finally ensure that the TSN services meet the time synchronization accuracy requirement of 1 us when the TSN services are transmitted within the 5G.

However, there is a problem that in the existing art when transmission time-delay compensation should be performed is not determined.

Summary

The present invention provides a method, an apparatus, and a device, which may determine when to perform transmission time-delay compensation.

The present invention provides technical solutions as follows.

A method for compensating time-delay, which is applied to a terminal device, includes: receiving first information, wherein the first information is used for the terminal device to determine whether to perform transmission time-delay compensation; and determining whether to perform the transmission time-delay compensation according to the first information.

A method for compensating time-delay, which is applied to a network device, includes: sending first information to a terminal device, wherein the first information is used for the terminal device to determine whether to perform transmission time-delay compensation, wherein the terminal device determines whether to perform the transmission time-delay compensation according to the first information.

An apparatus for compensating time-delay includes: a receiving unit, configured to receive first information, wherein the first information is used for the terminal device to determine whether to perform transmission time-delay compensation; and a determining unit, configured to determine whether to perform the transmission time-delay compensation according to the first information.

An apparatus for compensating time-delay includes: a sending unit, configured to send first information to a terminal device, wherein the first information is used for the terminal device to determine whether to perform transmission time-delay compensation, wherein the terminal device determines whether to perform the transmission time-delay compensation according to the first information.

A terminal device includes: a processor, a memory, and a network interface; the processor invokes a program in the memory to execute any one of the above method for compensating time-delay applied to the terminal device, and send out an execution result through the network interface.

A network device includes: a processor, a memory and a network interface; the processor invokes a program in the memory to execute any one of the above method for compensating time-delay applied to the network device, and sends out an execution result through the network interface.

A chip includes: a processor, configured to invoke, from a memory, and run a computer program, to enable a device having the chip installed thereon to perform any one of the above methods for compensating time-delay.

A computer-readable storage medium is provided, in which a program of a method for compensating time-delay is stored, wherein when the program of the method for compensating time-delay is executed by a processor, any one of the above methods for compensating time-delay is implemented.

A computer program product is stored in a non-transitory computer-readable storage medium, wherein when a computer program is executed, any one of the above methods for compensating time-delay is implemented.

The present invention has beneficial effects as follows: embodiments of the present application discloses a method for compensating time-delay, and an apparatus for compensating time-delay, in which a terminal device receives first information that includes a transmission time-delay compensation parameter and is sent by a network device, and determines, according to the transmission time-delay compensation parameter, whether performing transmission time-delay compensation is needed, thereby solving a problem that when to perform the transmission time-delay compensation cannot be determined in the existing art. Therefore a service transmission in a communication network can achieve an accuracy requirement of time synchronization.

DETAILED DESCRIPTION

In order to make objectives, technical solutions and advantages of the present invention clearer, the present invention will be described in further detail below in conjunction with the drawings and embodiments. It should be understood that the embodiments described herein are only for explaining the present invention and are not intended to limit the present invention. However, the present invention may be implemented in many different forms and is not limited to the embodiments described herein. On the contrary, a purpose of providing these embodiments is to make understanding of disclosed contents of the present utility model more thorough and comprehensive. According to the specific embodiments of the present application, all other specific embodiments achieved by a person of ordinary skill in the art without making inventive efforts are within the protection scope of the present application.

When the following description relates to the drawings, unless otherwise stated, the same numbers in different drawings indicate the same or similar elements.

In addition, the terms "system" and "network" are often used interchangeably herein. The term "and/or" herein only describes an association relation between associated objects, indicating that there may be three relations, for example, A and/or B may indicate three cases: A alone, both A and B, and B alone. In addition, the symbol "/" herein generally indicates that objects before and after the symbol "/" have an "or" relationship.

It should be understood that in the specific embodiments of the present application, "that B corresponds to A" indicates that B is associated with A, and B may be determined according to A. However, it should be further understood that determining B according to A does not mean that B is determined according to A only, and B may be determined according to A and/or other information.

Figure 1:
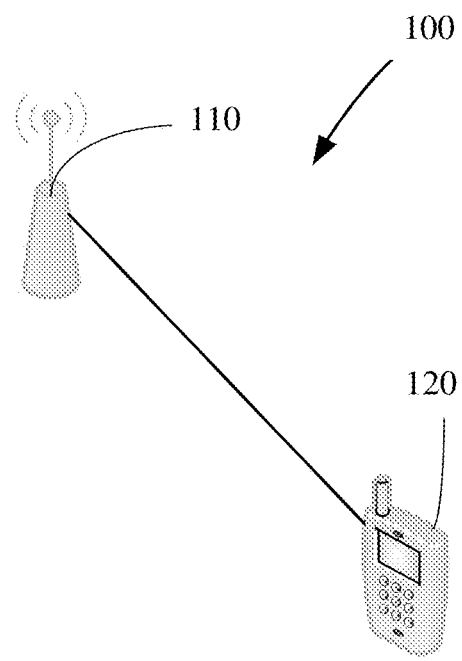
FIG. 1 is an architecture diagram of a system to which a specific embodiment of the present application is applied.

Referring to FIG. 1, FIG. 1 shows a wireless communication system 100 to which an embodiment of the present application is applied. The wireless communication system includes a network device 110 and at least one terminal device 120 located in a coverage area of the network device 110.

Optionally, the wireless communication system 100 may include multiple network devices, and a coverage area of each network device may include other quantity of terminal devices, which is not limited in the embodiments of the present application.

The wireless communication system 100 in the embodiments of the present application may be the following communication system, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunications System (UMTS), Wireless Local Area Networks (WLANs), Wireless Fidelity (WiFi), a next generation communication system, or another communication system.

Optionally, the communication system in the embodiments of the present application may be applied to a Carrier Aggregation (CA) scenario, or a Dual Connectivity (DC) scenario, or a Standalone (SA) network deployment scenario.

The network device 110 may provide communication coverage for a specific geographical area, and may communicate with a terminal device (e.g., UE) within the coverage area. Optionally, the network device 100 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a network side device in a 5G network, or a network device in a future evolved Public Land Mobile Network (PLMN).

The terminal device 120 may be mobile or fixed. Optionally, the terminal device 120 may refer to an access terminal, a User Equipment (UE), a subscriber unit, a subscriber station, a mobile station, a mobile platform, a remote station, a remote terminal, a mobile device, a terminal device, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Figure 2:
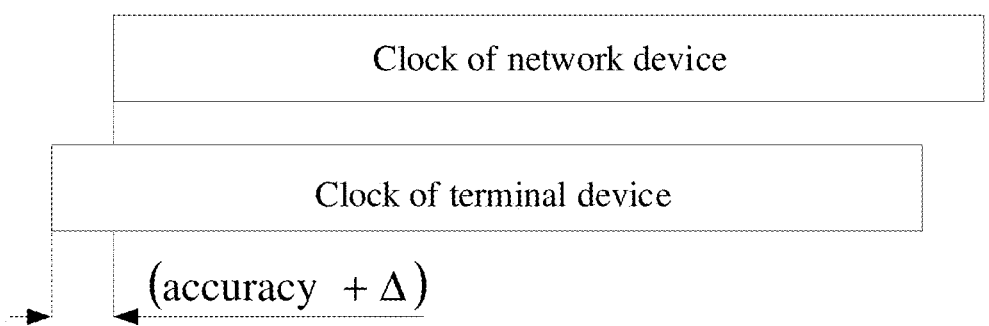
FIG. 2 is a schematic diagram of a time synchronization time relationship between a network device and a terminal device.

As shown in FIG. 2, whether a TSN service can reach a preset time synchronization accuracy (such as 1 us) when the TSN service is transmitted within 5G, from the air interface, is related to a time synchronization accuracy notified by the network device and a time synchronization accuracy error $\Delta$(Delta) of the terminal device. However, a synchronization error of the terminal device is determined by RAN1, and is related to many factors, such as a propagation loss, or a device limitation, etc.; and time synchronization information and time synchronization accuracy information notified by the network device are included in TimeReferenceInfo IE. The following embodiments of the present application will explain how to perform transmission time-delay compensation.

First Embodiment

Figure 3:
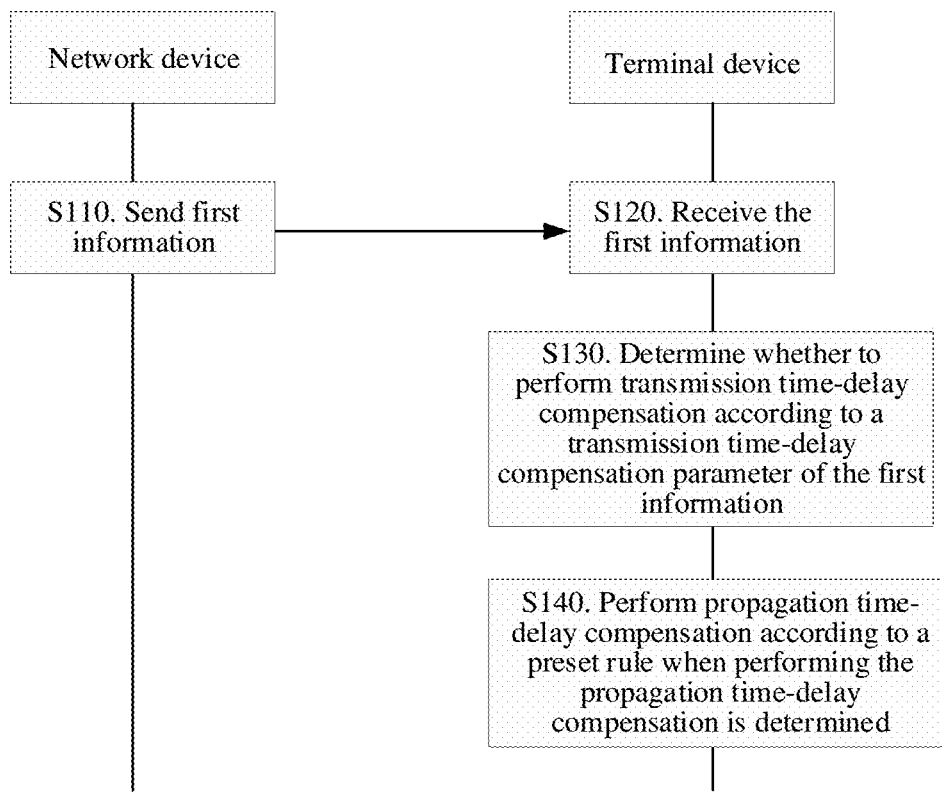
FIG. 3 is a flowchart of a method for compensating time-delay according to a first embodiment of the present application.

Referring to FIG. 3, FIG. 3 is a method for compensating time-delay according to the first embodiment of the present application, which includes following acts S110 to S130.

In the act S110, a network device sends first information to a terminal device, wherein the first information is used for the terminal device to determine whether to perform transmission time-delay compensation.

In the act S120, the terminal device receives the first information.

In the act S130, the terminal device determines whether to perform the transmission time-delay compensation according to the first information.

Optionally, the first information is broadcast information, that is, multiple terminal devices receive the first information with the same content; and/or, the first information is user-specific information, that is, each terminal device receives the first information sent to it itself, and different terminal devices may receive different first information.

Optionally, the first information includes a transmission time-delay compensation parameter. Then the act S130 includes: an act S131, whether to perform the transmission time-delay compensation is determined according to propagation time-delay compensation information.

Optionally, the propagation time-delay compensation parameter may be a transmission compensation threshold, or propagation time-delay compensation indication information, wherein the propagation time-delay compensation indication information is used for indicating to the terminal device whether to perform the transmission time-delay compensation.

If the propagation time-delay compensation parameter is the transmission compensation threshold, the act S131 includes following act S1311.

In the act S1311, whether to perform the transmission time-delay compensation is determined according to the transmission compensation threshold. Specific examples may include the following two examples.

First Example

Whether performing the transmission time-delay compensation is needed is determined based on a Timing Advance Ta. Specifically, the transmission compensation threshold is a threshold value of the timing advance. Then, the act S1311 includes: it is determined that the transmission time-delay compensation is performed if the timing advance Ta of the terminal device is larger than the threshold value of the timing advance, otherwise, it is determined that the transmission time-delay compensation is not performed; or, it is determined that the transmission time-delay compensation is performed if the timing advance Ta of the terminal device is not less than the threshold value of the timing advance, otherwise, it is determined that the transmission time-delay compensation is not performed; or, it is determined that the transmission time-delay compensation is performed if the timing advance Ta of the terminal device is less than the threshold value of the timing advance, otherwise, it is determined that the transmission time-delay compensation is not performed; or, it is determined that the transmission time-delay compensation is performed if the timing advance Ta of the terminal device is not greater than the threshold value of the timing advance, otherwise, it is determined that the transmission time-delay compensation is not performed; or, it is determined that the transmission time-delay compensation is performed if the timing advance Ta of the terminal device is equal to the threshold value of the timing advance, otherwise, it is determined that the transmission time-delay compensation is not performed.

Second Example

Whether performing the transmission time-delay compensation is needed is determined based on a Reference Signal Receiving Power (RSRP). Specifically, the transmission compensation threshold is a Reference Signal Receiving Power (RSRP) threshold value. Then, the act S1311 includes: it is determined that the transmission time-delay compensation is performed if the Reference Signal Receiving Power (RSRP) of the terminal device is greater than the Reference Signal Receiving Power (RSRP) threshold value, otherwise, it is determined that the transmission time-delay compensation is not performed; or, it is determined that the transmission time-delay compensation is performed if the Reference Signal Receiving Power (RSRP) of the terminal device is not less than the Reference Signal Receiving Power (RSRP) threshold value, otherwise, it is determined that the transmission time-delay compensation is not performed; or, it is determined that the transmission time-delay compensation is performed if the Reference Signal Receiving Power (RSRP) of the terminal device is less than the Reference Signal Receiving Power (RSRP) threshold value, otherwise, it is determined that the transmission time-delay compensation is not performed; or, it is determined that the transmission time-delay compensation is performed if the Reference Signal Receiving Power (RSRP) of the terminal device is not greater than the Reference Signal Receiving Power (RSRP) threshold value, otherwise, it is determined that the transmission time-delay compensation is not performed; or, it is determined that the transmission time-delay compensation is performed if the Reference Signal Receiving Power (RSRP) of the terminal device is equal to the Reference Signal Receiving Power (RSRP) threshold value, otherwise, it is determined that the transmission time-delay compensation is not performed.

If the propagation time-delay compensation parameter is the propagation time-delay compensation indication information, the act S131 includes: an act S1312, whether to perform the transmission time-delay compensation is determined according to the propagation time-delay compensation indication information. Specifically, the propagation time-delay compensation indication information is an action indication, which directly indicates the terminal of whether to perform the transmission time-delay compensation. For example, the propagation time-delay compensation indication information is 1 bit information, 0 indicates that the transmission time-delay compensation is not performed, and 1 indicates that the transmission time-delay compensation is performed.

Optionally, the method further includes: an act S140, if it is determined that the transmission time-delay compensation is performed, transmission time-delay compensation is performed according to a preset rule. Optionally, when it is determined that performing the transmission time-delay compensation is not needed, the transmission time-delay compensation is not performed.

Optionally, the first information may be carried in a high layer message, for example, the first information is carried in Radio Resource Control (RRC) signaling, or configured by RRC signaling; and/or, the first information may be carried in a physical layer message, for example, the first information is carried in Downlink Control Information (DCI), or configured by the DCI.

The first embodiment of the present application discloses a method for compensating time-delay. In method for compensating time-delay, when the terminal device receives the first information sent by the network device, the terminal device determines whether performing time-delay compensation is needed according to the transmission time-delay compensation parameter included in the first information, and the transmission time-delay compensation is performed according to the preset rule only when compensation is needed. Thereby the problem that when to perform the transmission time-delay compensation cannot be determined in the existing art, is solved, so that the service transmission in the communication network can achieve an accuracy requirement of time synchronization.

Second Embodiment

Figure 4:
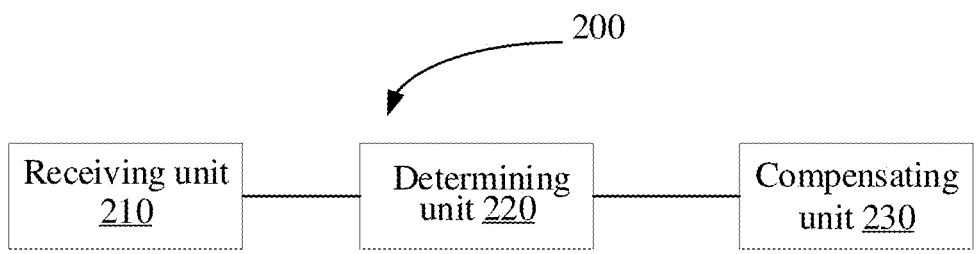
FIG. 4 is a module diagram of an apparatus for compensating time-delay according to a second embodiment of the present application.

Referring to FIG. 4, FIG. 4 is an apparatus 200 for compensating time-delay according to the second embodiment of the present application, which may be applied to the terminal device. The apparatus includes: a receiving unit 210, and a determining unit 220.

The receiving unit 210 is configured to receive first information, wherein the first information is used for the terminal device to determine whether to perform transmission time-delay compensation.

The determining unit 220 is configured to determine whether to perform the transmission time-delay compensation according to the first information.

Optionally, the first information is broadcast information, that is, multiple terminal devices receive the first information with the same content; and/or, the first information is user-specific information, that is, each terminal device receives the first information sent to itself, and different terminal devices may receive different first information.

Optionally, the first information includes a transmission time-delay compensation parameter. Then the determining unit 220 is specifically configured to determine whether to perform the transmission time-delay compensation according to propagation time-delay compensation information.

Optionally, the propagation time-delay compensation parameter may be a transmission compensation threshold, or propagation time-delay compensation indication information, wherein the propagation time-delay compensation indication information is used for indicating to the terminal device whether to perform transmission time-delay compensation.

If the propagation time-delay compensation parameter is the transmission compensation threshold, the determining unit 220 is specifically configured to determine whether to perform the transmission time-delay compensation according to the transmission compensation threshold. Specifically, there may be the following two examples.

First Example

The transmission compensation threshold is a threshold value of timing advance Ta. Then, the determining unit 220 is specifically configured to determine that the transmission time-delay compensation is performed if timing advance Ta of the terminal device is greater than the threshold value of the timing advance, otherwise, determine that the transmission time-delay compensation is not performed; or, determine that the transmission time-delay compensation is performed if the timing advance Ta of the terminal device is not less than the threshold value of the timing advance, otherwise, determine that the transmission time-delay compensation is not performed; or, determine that the transmission time-delay compensation is performed if the timing advance Ta of the terminal device is less than the threshold value of the timing advance, otherwise, determine that the transmission time-delay compensation is not performed; or, determine that the transmission time-delay compensation is performed if the timing advance Ta of the terminal device is not greater than the threshold value of the timing advance, otherwise, determine that the transmission time-delay compensation is not performed; or, determine that the transmission time-delay compensation is performed if the timing advance Ta of the terminal device is equal to the threshold value of the timing advance, otherwise, determine that the transmission time-delay compensation is not performed.

Second Example

The transmission compensation threshold is a Reference Signal Receiving Power (RSRP) threshold value. Then, the determining unit 220 is specifically configured to determine that the transmission time-delay compensation is performed if a Reference Signal Receiving Power (RSRP) of the terminal device is greater than the Reference Signal Receiving Power (RSRP) threshold value, otherwise, determine that the transmission time-delay compensation is not performed; or, determine that the transmission time-delay compensation is performed if the Reference Signal Receiving Power (RSRP) of the terminal device is not less than the Reference Signal Receiving Power (RSRP) threshold value; otherwise, determine that the transmission time-delay compensation is not performed; or, determine that the transmission time-delay compensation is performed if the Reference Signal Receiving Power (RSRP) of the terminal device is less than the Reference Signal Receiving Power (RSRP) threshold value, otherwise, determine that the transmission time-delay compensation is not performed; or, if the Reference Signal Receiving Power (RSRP) of the terminal device is not greater than the Reference Signal Receiving Power (RSRP) threshold value, determine that the transmission time-delay compensation is performed, otherwise, determine that the transmission time-delay compensation is not performed; or, determine that the transmission time-delay compensation is performed if the Reference Signal Receiving Power (RSRP) of the terminal device is equal to the Reference Signal Receiving Power (RSRP) threshold value RSRP Threshold, otherwise, determine that the transmission time-delay compensation is not performed.

If the propagation time-delay compensation parameter is the propagation time-delay compensation indication information, then, the determining unit 220 is specifically configured to determine whether to perform transmission time-delay compensation according to the propagation time-delay compensation indication information.

Optionally, the apparatus further includes a compensating unit 230 configured to perform the transmission time-delay compensation according to a preset rule if it is determined that the transmission time-delay compensation is performed.

For details that are not exhaustive in the present second embodiment, corresponding contents in the first embodiment described above may be referred to, and the details that are not exhaustive in the present second embodiment will not be repeated here.

Third Embodiment

Figure 5:
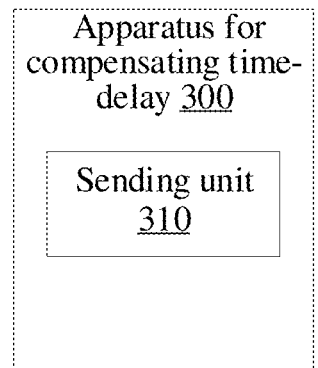
FIG. 5 is a module diagram of an apparatus for compensating time-delay according to a third embodiment of the present application.

Referring to FIG. 5, FIG. 5 is an apparatus 300 for compensating time-delay according to the third embodiment of the present application, which may be applied to the terminal device. The apparatus includes: a sending unit 310.

The sending unit 310 is configured to send first information to the terminal device, wherein the first information is used for the terminal device to determine whether to perform transmission time-delay compensation.

Optionally, the first information is broadcast information, or the first information is user-specific information.

Optionally, the first information includes propagation time-delay compensation information. In this case, the terminal device determines whether to perform the transmission time-delay compensation according to the first information, which includes: the terminal device determines whether to perform the transmission time-delay compensation according to the propagation time-delay compensation information.

Optionally, the propagation time-delay compensation parameter may be a transmission compensation threshold, or propagation time-delay compensation indication information, wherein the propagation time-delay compensation indication information is used for indicating to the terminal device whether to perform transmission time-delay compensation.

In a case where the propagation time-delay compensation parameter is the transmission compensation threshold, the terminal device determines whether to perform the transmission time-delay compensation according to the transmission time-delay compensation parameter, which includes: the terminal device determines whether to perform the transmission time-delay compensation according to the transmission compensation threshold. Specifically, there may be the following two examples.

First Example

Optionally, the transmission compensation threshold is a threshold value of timing advance. In this case, the terminal device determines whether to perform the transmission time-delay compensation according to the transmission compensation threshold, which includes: the terminal device determines that the transmission time-delay compensation is performed if timing advance Ta of the terminal device is larger than the threshold value of the timing advance, otherwise, the terminal device determines that the transmission time-delay compensation is not performed; or, the terminal device determines that the transmission time-delay compensation is performed if the timing advance Ta of the terminal device is not less than the threshold value of the timing advance, otherwise, the terminal device determines that the transmission time-delay compensation is not performed; or, the terminal device determines that the transmission time-delay compensation is performed if the timing advance Ta of the terminal device is less than the threshold value of the timing advance, otherwise, the terminal device determines that the transmission time-delay compensation is not performed; or, the terminal device determines that the transmission time-delay compensation is performed if the timing advance Ta of the terminal device is not greater than the threshold value of the timing advance, otherwise, the terminal device determines that the transmission time-delay compensation is not performed; or, the terminal device determines that the transmission time-delay compensation is performed if the timing advance Ta of the terminal device is equal to the threshold value Threshold of the timing advance, otherwise, the terminal device determines that the transmission time-delay compensation is not performed.

In a case where the transmission compensation threshold is a Reference Signal Receiving Power (RSRP) threshold value, the terminal device determines whether to perform the transmission time-delay compensation according to the transmission compensation threshold, which includes: the terminal device determines that the transmission time-delay compensation is performed if the Reference Signal Receiving Power (RSRP) of the terminal device is greater than the Reference Signal Receiving Power (RSRP) threshold value, otherwise, the terminal device determines that the transmission time-delay compensation is not performed; or, the terminal device determines that the transmission time-delay compensation is performed if the Reference Signal Receiving Power (RSRP) of the terminal device is not less than the Reference Signal Receiving Power (RSRP) threshold value, otherwise, the terminal device determines that the transmission time-delay compensation is not performed; or, the terminal device determines that the transmission time-delay compensation is performed if the Reference Signal Receiving Power (RSRP) of the terminal device is less than the Reference Signal Receiving Power (RSRP) threshold value, otherwise, the terminal device determines that the transmission time-delay compensation is not performed; or, the terminal device determines that the transmission time-delay compensation is performed if the Reference Signal Receiving Power (RSRP) of the terminal device is not greater than the Reference Signal Receiving Power (RSRP) threshold value, otherwise, the terminal device determines that the transmission time-delay compensation is not performed; or, the terminal device determines that the transmission time-delay compensation is performed if the Reference Signal Receiving Power (RSRP) of the terminal device is equal to the Reference Signal Receiving Power (RSRP) threshold value RSRP Threshold, otherwise, the terminal device determines that the transmission time-delay compensation is not performed.

In a case where the propagation time-delay compensation parameter is the propagation time-delay compensation indication information, the terminal device determines whether to perform the transmission time-delay compensation according to the transmission time-delay compensation parameter, which includes: the terminal device determines whether to perform the transmission time-delay compensation according to the propagation time-delay compensation indication information.

For details that are not exhaustive in the third embodiment, the same or corresponding portions in the first to second embodiments described above may be referred to, and the details that are not exhaustive in the third embodiment will not be repeated here.

Fourth Embodiment

Figure 6:
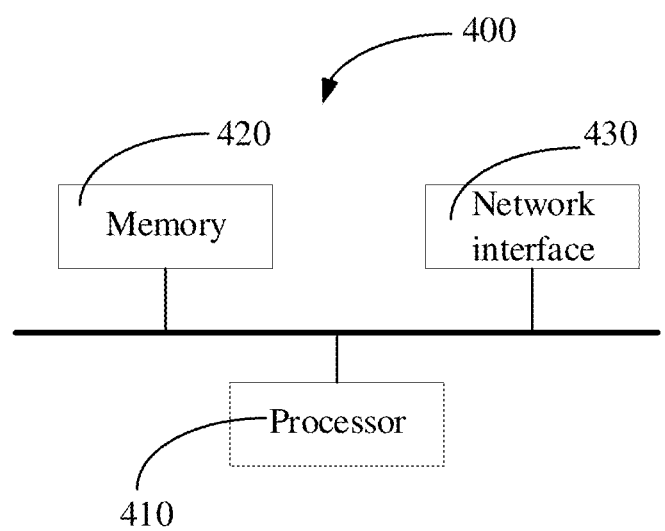
FIG. 6 is a schematic structural diagram of a device according to a fourth embodiment of the present application.

Referring to FIG. 6, FIG. 6 is a schematic structural diagram of a device 400 according to the fourth embodiment of the present invention. The device 400 includes a processor 410, a memory 420, and a network interface 430. The processor 410 calls a program in the memory 420, and when the program is run, the processor 410 may execute various acts applied to the network device or various acts applied to the terminal device in the method for compensating time-delay according to the first embodiment described above, and send out an execution result through the network interface 430.

The processor 410 may be an independent component or a collective name of multiple processing elements. For example, the processor 610 may be a Central Processing Unit (CPU), an Application Specific Integrated Circuit (ASIC), or one or more integrated circuits configured to implement the methods described above, such as at least one Digital Signal Processor (DSP), or at least one Field Programmable Gate Array (FPGA).

The present invention is described with reference to flowcharts and/or block diagrams of the methods, devices (systems), computer programs, and computer program products according to the embodiments of the present invention. It should be understood that each flow and/or block in the flowcharts and/or block diagrams, and combinations of flows and/or blocks in the flowcharts and/or block diagrams may be implemented by computer program instructions. These computer program instructions may be provided to a general purpose computer, a special purpose computer, an embedded processor, a chip, or a processor of another programmable data processing device to generate a machine, such that an apparatus for implementing functions specified in one or more flows in the flowcharts and/or one or more blocks in the block diagrams is generated through instructions executed by a computer or a processor of another programmable data processing device. The program may be stored in a computer-readable storage medium, which may include a Read Only Memory (ROM), a Random Access Memory (RAM), a magnetic disk, or an optical disk, etc.

The above embodiments illustrate but do not limit the present invention, and those skilled in the art can design multiple alternative examples within the scope of the claims. Those skilled in the art to which the present application pertains should recognize that appropriate adjustments, modifications, etc., may be made to specific implementations without departing from the scope of the present invention as defined in the appended claims. Therefore, any modifications and changes made in accordance with the spirit and principles of the present invention are within the scope of the present invention as defined by the appended claims.

The invention claimed is:

1. A method for compensating time-delay, applied to a terminal device, comprising:
   receiving first information from a Radio Resource Control (RRC) message, wherein the first information comprises a propagation time-delay compensation parameter and is used for the terminal device to determine whether to perform propagation time-delay compensation;
   when the propagation time-delay compensation parameter is a propagation compensation threshold, the propagation compensation threshold comprises Reference Signal Receiving Power (RSRP) threshold value;
   determining that the propagation time-delay compensation is performed in case of a RSRP of the terminal device is greater than or equal to the RSRP threshold value; and
   when the propagation time-delay compensation parameter is propagation time-delay compensation indication information, the propagation time-delay compensation indication information is an action indication;
   determining whether to perform the propagation time-delay compensation according to the action indication.

2. The method of claim 1, further comprising:
   determining that the propagation time-delay compensation is not performed in case of the RSRP of the terminal device is less than the RSRP threshold value.

3. The method of claim 1, further comprising:
   performing the propagation time-delay compensation according to a preset rule if performing the propagation time-delay compensation is determined.

4. An apparatus for compensating time-delay, applied to a terminal device, comprising:
   a receiver, configured to receive first information from a Radio Resource Control (RRC) message, wherein the first information comprises a propagation time-delay compensation parameter and is used for the terminal device to determine whether to perform propagation time-delay compensation; and
   a processor, configured to:
      when the propagation time-delay compensation parameter is a propagation compensation threshold, the propagation compensation threshold comprises Reference Signal Receiving Power (RSRP) threshold value, determine that the propagation time-delay compensation is performed in case of a RSRP of the terminal device is greater than or equal to the RSRP threshold value; and
      when the propagation time-delay compensation parameter is propagation time-delay compensation indication information, the propagation time-delay compensation indication information is an action indication, determine whether to perform the propagation time-delay compensation according to the action indication.

5. The apparatus of claim 4, wherein
   the processor is further configured to perform the propagation time-delay compensation according to a preset rule if performing the propagation time-delay compensation is determined.

6. An apparatus for compensating time-delay, applied to a network device, comprising:
   a transmitter, configured to send first information to a terminal device through a Radio Resource Control (RRC) message, wherein the first information comprises a propagation time-delay compensation parameter, and is used for the terminal device to determine whether to perform propagation time-delay compensation;
   wherein the propagation time-delay compensation parameter is a propagation compensation threshold, the propagation compensation threshold comprises Reference Signal Receiving Power RSRP) threshold value, or,
   the propagation time-delay compensation parameter is propagation time-delay compensation indication information, the propagation time-delay compensation indication information is an action indication, the action indication directly indicates the terminal device of whether to perform the propagation time-delay compensation.

* * * * *